United States Patent [19]
Ohira

[11] Patent Number: 5,519,445
[45] Date of Patent: May 21, 1996

[54] TELEVISION RECEIVER HAVING CAPTION DISPLAYING CAPABILITY

[75] Inventor: Yoshifumi Ohira, Saitama, Japan

[73] Assignee: Kabushiki Kaisha Toshiba, Kawasaki, Japan

[21] Appl. No.: 312,622

[22] Filed: Sep. 27, 1994

[30] Foreign Application Priority Data

Sep. 27, 1993 [JP] Japan .................................... 5-239880

[51] Int. Cl.$^6$ ................................ H04N 3/27; H04N 3/22
[52] U.S. Cl. ........................ 348/556; 348/581; 348/687
[58] Field of Search ...................................... 348/554, 555, 348/556, 581, 687, 704, 805; 358/180; 315/386, 383, 403, 371; H04N 3/27, 3/22

[56] References Cited

U.S. PATENT DOCUMENTS 5,317,401   5/1994   Dupont ..................... 348/687

FOREIGN PATENT DOCUMENTS 63-18872   1/1988   Japan .
564027   3/1993   Japan .

Primary Examiner—James J. Groody
Assistant Examiner—Sherrie Hsia
Attorney, Agent, or Firm—Cushman Darby & Cushman

[57] ABSTRACT

A television received fop supplying video signals to a picture tube so as to display pictures on the screen in a first mode of the normal state and a second mode with the vertical amplitude expanded, includes, a vertical sawtooth waveform generator for generating sawtooth signals in a period corresponding to the vertical sync signals that are input to the vertical sawtooth waveform generator, an amplitude controller for switching amplitudes of the sawtooth signals from the vertical sawtooth waveform generator according to the first and the second modes and for expanding the amplitude in the second mode rather than the first mode, an inclination controller for making the inclination of the vertical sawtooth signal gentle at the timing corresponding to the end of the vertical scanning period in the second mode, and a brightness controller for controlling the brightness of the video signal corresponding to the end period of the vertical scanning to be decreased in the second mode.

2 Claims, 3 Drawing Sheets

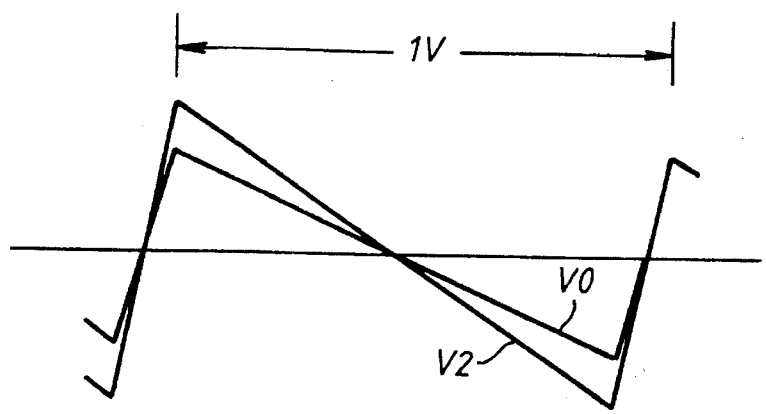
Fig. 4 (a)
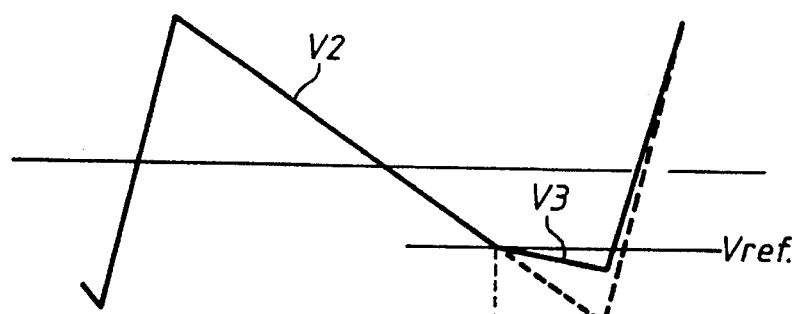
Fig. 4 (b)
Fig. 4 (c)
Fig. 4 (d)
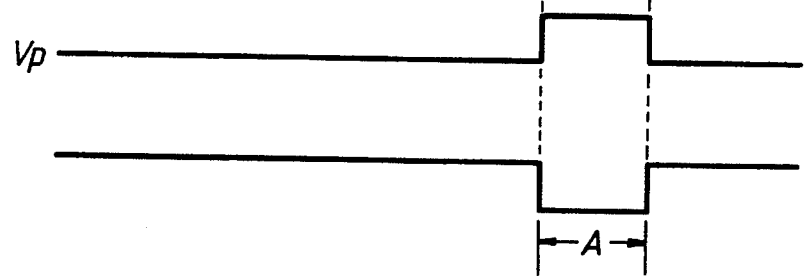
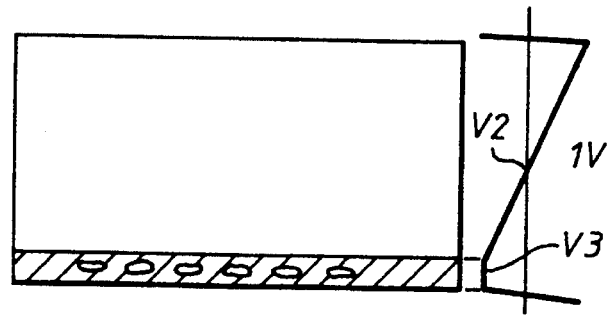
Fig. 4 (e)

TELEVISION RECEIVER HAVING CAPTION DISPLAYING CAPABILITY

FIELD OF THE INVENTION

The present invention related to a television receiver having a caption superimposing capability, and more particularly to a television receiver adapted for the 16:9 wide aspect specification.

BACKGROUND OF THE INVENTION

In Japan the NTSC television broadcasting system is adopted at present. Recently, recently a wide aspect screen high precision HDTV broadcasting has been started. In the HDTV broadcasting, the aspect ratio of the screen differs from that of the NTSC system. In addition, a television receiver with a 16:9 aspect ratio screen which is wider than the 4:3 aspect ratio screen of the current NTSC television receiver has been adopted. The Television receiver downconverts the HDTV broadcasting signal to the current NTSC system broadcasting signal to enable viewers to enjoy the HDTV broadcasting program on the NTSC system television receivers. Even in this case. To ensure viewing of full image information of the HDTV signal, the 16:9 wide aspect picture tube may be used for receiving the NTSC signal.

When images with the 4:3 aspect ratio are displayed on the 16:9 aspect ratio screen television receiver, the following display modes are available: A first display mode to display a 4:3 aspect ratio image on a central area of a wide aspect picture tube by compressing the horizontal time base of the NTSC signal; A second display mode to display a aspect ratio image on the full area of the 16:9 wide aspect ratio picture tube without compressing the horizontal time base, but expanding the vertical amplitude.

The second display mode is suited for displaying a movie software. That is, as shown in FIG. 1(a), when a movie is displayed on a 4:3 aspect ratio screen, it is displayed at a movie size aspect ratio. Thus, black blank areas are left on the top and bottom of the screen. However, if the movie is displayed on the 16:9 wide aspect picture tube by expanding the vertical amplitude, the black blank areas are removed from the screen while the movie picture is fully expanded over the screen, as shown in FIG. 1(b).

FIG. 2 shows a conventional circuit for expanding the vertical amplitude. In FIG. 2, reference 10 denotes a vertical sawtooth waveform generator, reference 20 denotes a vertical deflection circuit, reference Q1 denotes a switching transistor for switching the display modes. A mode control from a control circuit (not shown) is input to the base of the switching transistor Q1. For example, a low level signal is input to the transistor Q1 in the display mode to expand the vertical amplitude. A high level signal is input in the normal amplitude display mode.

The vertical sawtooth generating wave circuit 10 includes a ramp (i.e., sawtooth wave) generator 11 and an amplifier circuit 12. A vertical sync signal Vsync is supplied to the ramp generator 11. A capacitor C1 for charging and discharging is connected between a voltage source V1 and the ramp generator 11.

The ramp generator 11 synchronizes with the vertical sync signal Vsync and generates a sawtooth signal with an amplitude that is defined in accordance with the charging/discharging operations of the capacitor Further, the collector of the transistor G1 is connected with the ramp generator 11 via a resistor R1. Thus, in response to ON/OFF of this transistor G1, the charging/discharging level of the capacitor C1 varies to effect a change in the amplitude of the sawtooth signal.

The sawtooth wave output from the ramp generator 11 is amplified by the amplifier circuit 12 connected to the ramp generator 11, and then supplied to a vertical deflection circuit 20 through resistor R8 for outputting the sawtooth wave.

The vertical deflection circuit 20 is comprised of a transistor Q2 in the first stage and a complementary pair of transistors Q3 and Q4 coupled in a single ended push-pull arrangement with resistors R9 and R10 in the latter stage. The complementary transistors Q8 and Q4 coupled in the single ended push-pull arrangement in the latter state are driven by the sawtooth wave which is input to the base of the transistor Q2. Thus, a vertical deflection current is supplied to a deflection coil L1 which is connected to the complementary transistors Q3 and Q4 coupled in the single ended push-pull arrangement.

Further, a pump-up circuit 21 is provided for saving the power consumption by keeping a power supply voltage V2 to the transistors Q3 and Q4 at a high level during the vertical flyback period, while keeping it in a low level during the scanning period. Further, a block of capacitors C2, C3 and resistors R5 through R7 is connected between the deflection coil LI and the amplifier circuit 12 as a negative feedback loop of DC and AC components.

In the conventional circuit as described above, the vertical amplitude becomes normal amplitude when a high level control signal is input to the base of the transistor Q1, while it is expanded when a low level control signal is input to the base of the transistor Q1.

However, in the vertical amplitude expansion mode, pictures of a movie software can be displayed in an expanded size but the caption 50 is often superimposed on the black blank area (the blank space) at the bottom of the screen as shown in FIG. 1(b). Thus, the superimposed caption 50 is erased from the screen when the vertical amplitude is expanded.

To remove this fault, for instance, as disclosed in the Japanese Patent Application (TOKU-KAI-HEI) No. 5-64027 that has been filed previously by the applicant of this application, a method has been adopted to display a picture in a compressed form without erasing the superimposed caption by making the inclination of vertical sawtooth waveform gentle at the top and the bottom of the screen.

According to the prior art method, the superimposed caption takes a sufficient effect. However, as the caption is displayed in a reduced size, the raster density in the area of the reduced caption becomes high. Thus, a brightness of the caption excessively increases so that the screen glitters to decrease screen visibility/viewability. So, improvements in the processing of such captions are still demanded.

As described above, in the conventional television receivers, the vertical amplitude is expanded and an area superimposed with a caption is reduced. As a result, the raster density in the caption displaying area becomes high. Thus, a brightness of the superimposed caption excessively increases so that the superimposed caption has often made viewers to feel discomfortable and hard to see it.

SUMMARY OF THE INVENTION

The present invention has been made in view of such problems as described above.

It is, therefore, an object of the present invention to provide a television receiver capable of displaying pictures by reducing brightness signals for a period of time when amplitude inclinations are gentle at the lower portion of the screen where the caption is superimposed.

In order to achieve the above object, a television receiver for supplying video signals to a picture tube so as to display pictures on the screen in a first mode of the normal state and a second mode with the vertical amplitude expanded, includes, a vertical sawtooth waveform generator for generating sawtooth signals in a period corresponding to the vertical sync signals that are input to the vertical sawtooth waveform generator, an amplitude controller for switching amplitudes of the sawtooth signals from the vertical sawtooth waveform generator according to the first and the second modes and for expanding the amplitude in the second mode rather than the first mode, an inclination controller for making the inclination of the vertical sawtooth signal gentle at the timing corresponding to the end of the vertical scanning period in the second mode, and a brightness controller for controlling the brightness of the video signal corresponding to the end period of the vertical scanning to be decreased in the second mode.

In the present invention, it is possible to display pictures by reducing brightness of video signals during the period when the portion where captions are superimposed, that is, in the period when the inclination of the vertical scanning end is gentle. Thus the quality of picture can be improved without making viewers to feel discomfortable and hard to see the picture.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 8 is a block diagram showing one embodiment of a caption display apparatus according to the present invention; and FIGS. 4(a)–4(e) are timing charts for explaining the operation of the caption display apparatus shown in FIG. 3.

DESCRIPTION OF THE PREFERRED EMBODIMENTS

The present invention will be described in detail with reference to the FIGS. 3 to 4(e).

Figure 1:
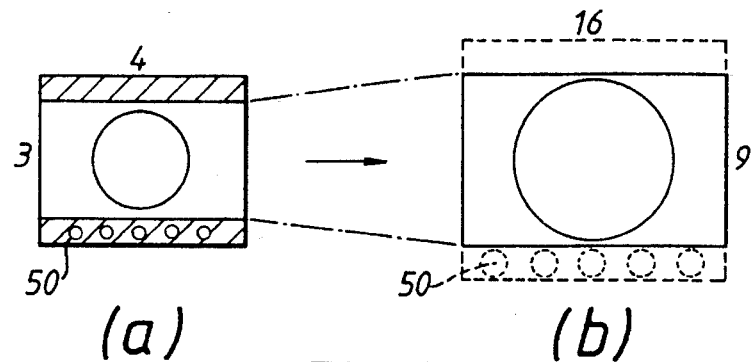
FIG. 1 is an explanatory diagram for explaining the display of a picture with a 4:3 aspect ratio by a wide aspect picture tube with a 16:9 aspect ratio.
Figure 2:
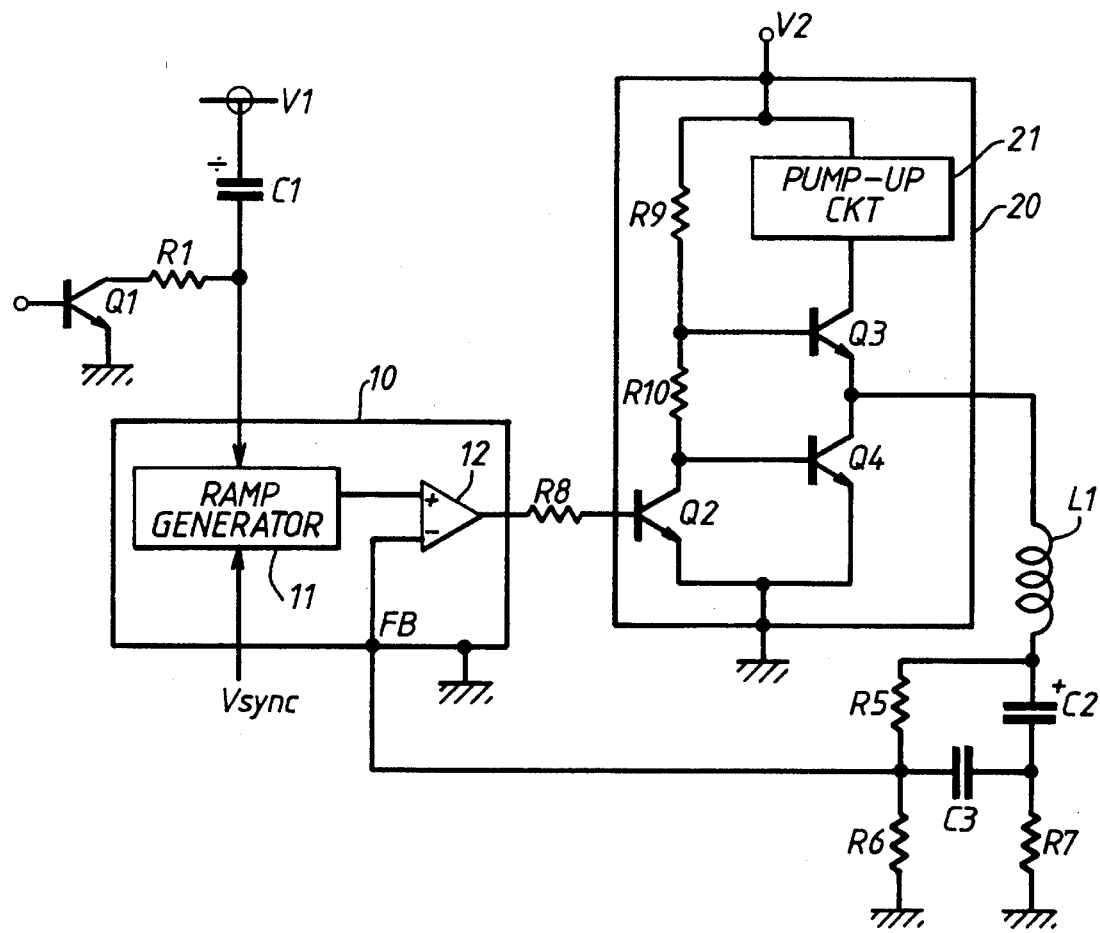
FIG. 2 is a circuit diagram showing a conventional caption display apparatus.

Throughout the drawings, reference numerals or letters in FIGS. 1 and 2 will be used to designate like or equivalent elements for simplicity of explanation.

Figure 3:
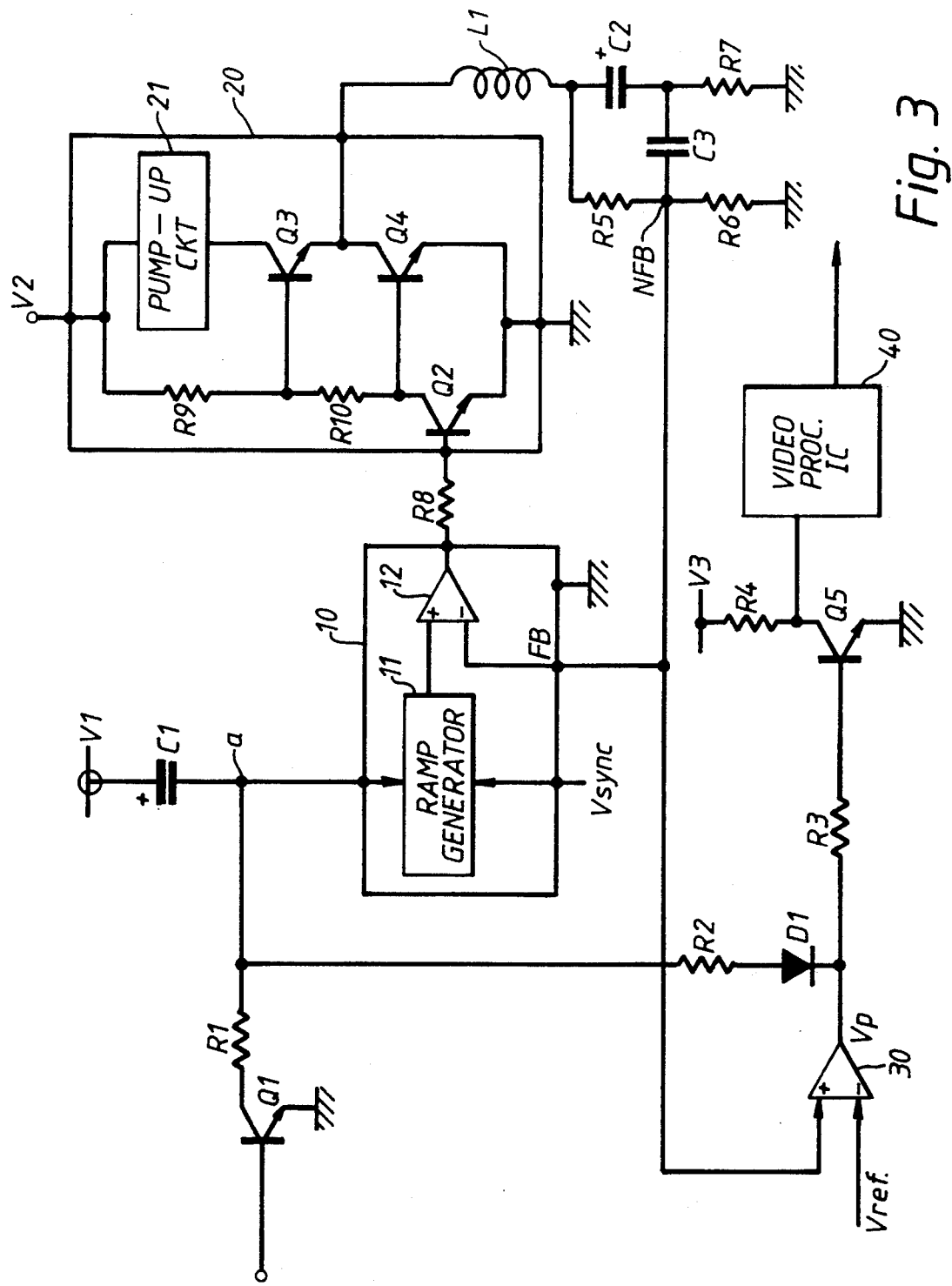

FIG. 3 is a circuit diagram showing one embodiment of a caption display apparatus according to the present invention.

In FIG. 3, elements like or similar to those in FIGURE 2 will be assigned with the same reference numerals or letters.

In FIG. 3, an arrangement of a transistor Q1, a ramp generator 10, a vertical deflection circuit 20 and a feedback circuit is the same as the corresponding one in FIG. 2. In a normal mode, a high level signal is input to the base of the transistor Q1 so that the transistor Q1 is turned ON, and thus the charge and discharge amount of a capacitor C1 decreases to cause the vertical amplitude become the normal level. While in a vertical amplitude expansion mode, a low level signal is input to the base of the transistor Q1 so that the transistor Q1 is turned OFF, and thus the charge and discharge amount of the capacitor C1 increases to cause the vertical amplitude be increased.

On the other hand, the collector of the transistor Q1 is connected with the output terminal of a comparator 30 via a diode D1 and a resistor R2. The comparator 30 is supplied on its inverted input terminal with a control voltage from a variable output DC power source (not shown). The control voltages from the variable output DC power source acts as a reference voltage Vref, while another non-inverted input terminal of the comparator 30 is applied a feedback voltage from a deflection coil L1, which will be described later.

The output of the comparator 30 is supplied to the base of a transistor Q5 via a resistor R3, and the collector of the transistor Q5 is connected to a brightness control terminal of a video signal processing IC 40 and to a voltage supply V3 via resist R4. The video signal processing IC 40 controls a brightness according to the signal supplied to the brightness control terminal.

Referring now to FIG. 4(a)–4(e), the operation of the apparatus shown in FIG. 3 will be described.

FIG. 4(a) shows amplitudes of vertical sawtooth waveforms V0 and V2 (these waveforms appear at the connection node a of the capacitor C1 and a ramp generator 11 shown in FIG. 3) in the normal mode and the expansion mode in the one vertical period (1V). The waveform V0 shows the amplitude in the normal mode, while the waveform V2 indicates the amplitude in the expansion mode. These amplitudes V0 and V2 are switched by changing the control signal supplied to the base of the transistor Q1. FIG. 4(b) shows the waveform when the superimposed caption is reduced its size in the expansion mode. The waveform V2 in the expansion mode is made its inclination gentle at the vertical bottom side of the screen, as shown by the portion V3. At which point of time the inclination is made gentle is determined by the reference voltage Vref of the comparator 30. If the amplitude of the vertical sawtooth waveform becomes lower than the reference voltage Vref, the output Vp of the comparator 30 becomes a high level as shown in FIG. 4(c). When the output Vp of the comparator 30 is low, the diode D1 is in the ON state. But if the output Vp changes to a high level, the diode D1 is turned OFF and the charging/discharging operation of the capacitor C1 reverses. Thus, the inclination of the sawtooth waveform becomes gentle, as shown by the waveform V3, and also the raster positioned at the bottom of the screen (corresponding to the superimposed caption) is displayed in a reduced size, but the caption does not disappear.

Thus the caption is superimposed in the reduced size. However, as the raster density increases, the brightness also increases. So, the brightness is controlled by applying the output Vp of the comparator 30 to the base of the transistor Q5. As the base voltage of the transistor Q5 becomes high in the period when the caption is superimposed, the collector voltage drops, as shown in FIG. 4(d), and the voltage at the brightness control terminal of the video signal processing IC 40 drops. Thus, it is possible to suppress the brightness of the superimposed caption from becoming high. FIG. 4(e) illustrates the effects of the voltage V3 on the screen, enabling display of a caption.

Further, although the above embodiment refers an example of controlling brightness of pictures by changing voltage at the brightness control terminal of the video signal processing IC 40, the brightness may be controlled by suppressing the contrast by controlling the voltage at the contrast control terminal.

As described above, according to the present invention, it becomes possible to display information outside the screen in the vertical amplitude expansion mode by compressing the information and to lowers the brightness on the reduced size caption. Accordingly it becomes possible to display pictures without causing noticeable level change of brightness, thus also without causing viewers to feel discomfortable and hard to see it. Further, it also becomes possible to protect a picture tube by suppressing abnormal increase of brightness.

As described above, the present invention can provide an extremely preferable television receiver having a caption display capability.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefor, it is intended that the present invention not be limited to the particular embodiment disclosed as the best mode contemplated for carrying out the present invention, but that the present invention includes all embodiments falling within the scope of the appended claims.

The foregoing description and the drawings are regarded by the applicant as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer or alternative inventive concepts that are included in the contents of the application and could be defined by claims differing in scope from the following claims, which different claims may be adopted subsequently during prosecution, for example, for the purposes of a divisional application.

What is claimed is:

1. A television receiver which receives video signals and displays pictures constituted by the video signals by partially changing between a first mode with a normal vertical amplitude and a second mode with an expanded vertical amplitude, the television receiver comprising:

vertical sawtooth signal generating means for generating a sawtooth signal having a period corresponding to an input vertical sync signal;

amplitude control means for changing the amplitude of the sawtooth signal generated by the vertical sawtooth generating means in response to the first and the second modes, the amplitude control means expanding the sawtooth signal to have a longer amplitude in the second mode than in the first mode;

inclination control means for changing an inclination of the sawtooth signal, the inclination being gentle at a timing corresponding to an end of a vertical scanning period in the second mode; and brightness control means for controlling an amount of brightness in a video signal corresponding to the sawtooth signal at the timing corresponding to the end period of the vertical scanning, the brightness being decreased in the second mode.

2. A television receiver which receives video signals and displays pictures constituted by the video signals by partially changing between a first mode with a normal vertical amplitude and a second mode with an expanded vertical amplitude, the television receiver comprising:

vertical sawtooth signal generating means for generating a sawtooth signal having a period corresponding to an input vertical sync signal;

amplitude control means for changing the amplitude of the sawtooth signal generated by the vertical sawtooth generating means in response to the first and the second modes, the amplitude control means expanding the sawtooth signal to have a longer amplitude in the second mode than in the first mode;

means for generating a first pulse at a timing corresponding to an end of vertical scanning;

inclination control means for changing a inclination of the sawtooth signal in the second mode so that the inclination is gentle during a first pulse period from the pulse generating means; and brightness control means for controlling an amount of brightness in a video signal corresponding to the sawtooth signal so that the brightness is decreased during the first pulse period.

* * * * *